United States Patent

[11] 3,601,329

[72] Inventors Arthur A. Hagstrom
Hoffman Estates;
Robert J. Ramig, Jr., Niles, both of, Ill.
[21] Appl. No. 756,158
[22] Filed Aug. 29, 1968
[45] Patented Aug. 24, 1971
[73] Assignee Teletype Corporation
Skokie, Ill.

[54] CENTER UNWINDING MECHANISM
9 Claims, 6 Drawing Figs.

[52] U.S. Cl. .......... 242/55.18
[51] Int. Cl. .......... B65h 17/48
[50] Field of Search .......... 242/55.18, 55.19, 55.21; 352/128

[56] References Cited

UNITED STATES PATENTS

| | | | |
|---|---|---|---|
| 1,946,604 | 2/1934 | Wittel | 242/55.18 X |
| 2,831,680 | 4/1958 | Rookus | 242/55.18 |
| 2,850,278 | 9/1958 | Simler | 242/55.19 |
| 3,388,873 | 6/1968 | Rosenbaum | 242/55.21 |

*Primary Examiner*—Stanley N. Gilreath
*Assistant Examiner*—Werner H. Schroeder
*Attorneys*—J. L. Landis and R. P. Usher

ABSTRACT: A center unwinding mechanism including a tape reel comprised of a pair of separable flanges and a winding hub attached to one of the flanges and a rotatably supported turntable having three fingers extending cantilever from it for receiving the reel with the fingers extending through the hub and for permitting removal of one of the flanges and the hub from the reel while the reel is mounted on the turntable.

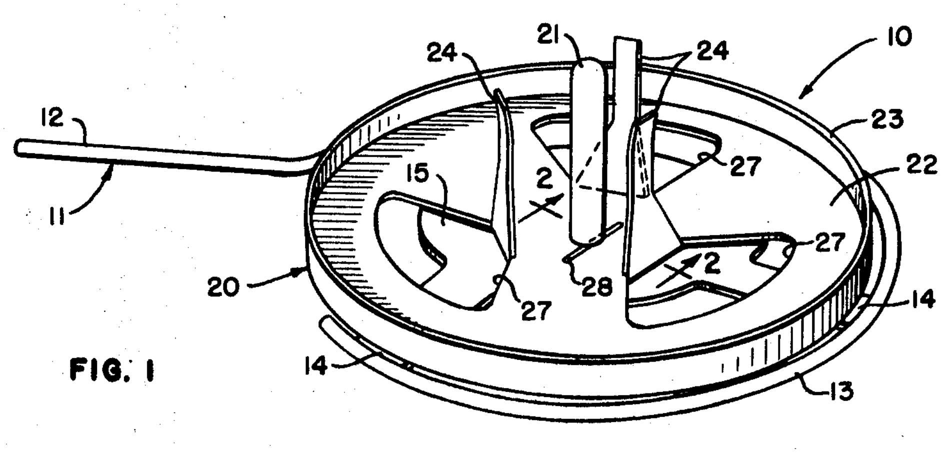
FIG. 1
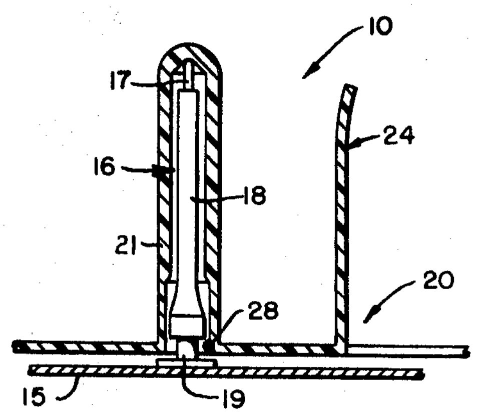
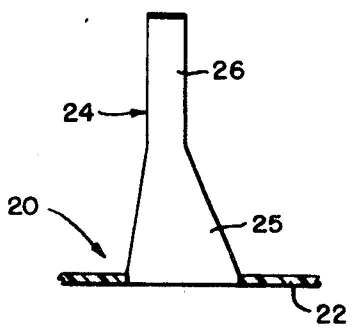
FIG. 2 FIG. 3
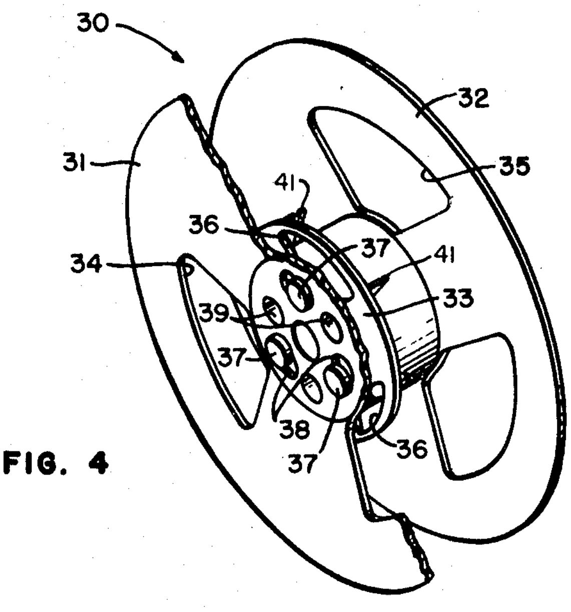
FIG. 4
INVENTORS
ARTHUR A. HAGSTROM
ROBERT J. RAMIG JR.
BY Michael A. O'Neil
ATTORNEY

CENTER UNWINDING MECHANISM

BACKGROUND OF THE INVENTION

Whenever tape, such as paper or magnetic recording tape, motion picture film, etc., is wound into a coil it is necessary either to rewind the tape or to provide means for unwinding the tape from the center of the coil if the tape is to be reused starting from the beginning. Center unwinding is more efficient because it eliminates the rewinding step. However, center unwinding has not been widely accepted because the center unwinding mechanisms provided heretofore either have required the use of open face reels, which have limited winding capacity, or have required the removal of a coil of tape to be unwound from a seperable reel, a step which includes the risk of the tape becoming uncoiled and tangled.

SUMMARY OF THE INVENTION

In the preferred embodiment a center unwinding mechanism in which the tape remains in its winding reel until it is in the device is comprised of a rotatably supported turntable having a center column, a tape reel including two flanges and a winding hub, means for receiving the reel on the turntable with the column passing through the hub and means for releasing one flange and the hub from the other flange while the reel is on the turntable.

DESCRIPTION OF THE DRAWINGS

A more complete understanding of the invention may be had by referring to the following Detailed Description when taken in conjunction with the drawings wherein:

FIG. 1 is a perspective view of a turntable useful in practicing the invention;

FIG. 2 is a partial sectional view of the turntable shown in FIG. 1 taken along the Line 2—2 in FIG. 1 in the direction of the arrows;

FIG. 3 is an elevational view of one of the fingers of the turntable shown in FIG. 1;

FIG. 4 is a perspective view of a tape reel useful in practicing the invention in which certain parts have been broken away more clearly to illustrate certain features of the invention;

DETAILED DESCRIPTION

Figure 5:
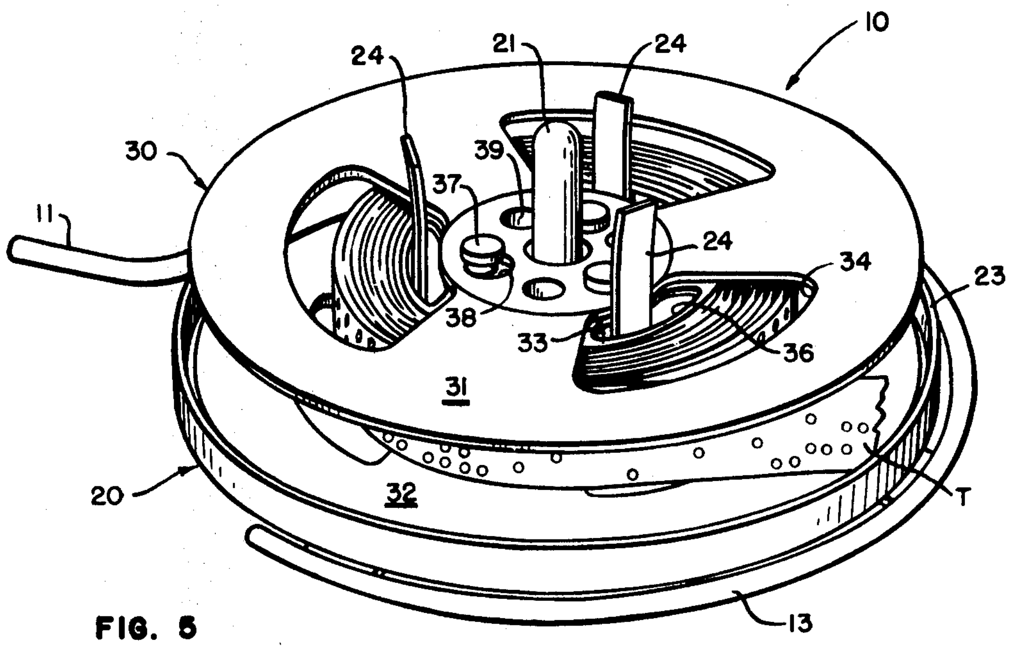
FIG. 5 is an enlarged perspective view showing the tape reel shown in FIG. 4 mounted on the turntable shown in FIG. 1.

Referring now to the drawings wherein like reference numerals designate like parts throughout the several views and referring particularly to FIG. 1 thereof there is shown a center unwinding mechanism 10 including a frame 11 which extends from a relatively straight supporting section 12 through a hooked shaped section 13. A plurality of brackets 14 extend radially inwardly from the hooked shaped section 13 of the frame 11 and terminate in a circular platform section 15. As is best shown in FIG. 2, a pivot pin 16 extends upwardly from the platform section 15. The pivot pin 16 includes a reduced upper portion 17, an enlarged center portion 18 and a reduced lower portion 19.

The center unwinding mechanism 10 also includes a turntable 20 mounted on the frame 11 for rotation with respect thereto and positioned entirely within the hooked shaped section 13 which serves to insure the rotational freedom of the turntable 20 should mechanism 10 come into contact with a foreign object. The turntable 20 includes an axle portion, herein extended into a closed end tube 21 which, as is best shown in FIG. 2, surrounds and is rotatably supported on the pivot pin 16. A platform 22 extends radially outwardly from the closed end tube 21 and terminates in a circular sidewall 23 which extends upwardly from the platform 22.

A plurality of fingers 24 also extend upwardly from the platform 22. The fingers 24 are arranged in a circular ring about the axis of the closed end tube 21 and serve to form a center column for mechanism 10. As is most clearly illustrated in FIG. 3, each finger 24 tapers from a relatively wide portion 25 at its attached end to a relatively narrow portion 26 at its distal end. As is best shown in FIG. 2 the fingers 24 taper outwardly toward the sidewall 23 of the platform 22 at their distal ends.

Referring again to FIG. 1, it ill be seen that an aperture 27 is formed in the platform section 22 of the turntable adjacent each of the fingers 24. By using apertures positioned adjacent the fingers 24, the turntable can be conveniently molded from plastic since all of the surfaces of the turntable can then be cored from either the top or the bottom. As is shown in FIGS. 1 and 2, the turntable is retained on the frame 11 by a pin 28 which extends from the upper surface of the platform 22 through the closed end tube 21 and through the reduced lower portion 19 of the pivot pin 16 to the platform 22. The use of the pin 28 assures that the turntable is retained on the frame 11. While remaining free to rotate with respect to the frame 11 substantially without friction.

Referring now to FIG. 4 there is shown a tape reel 30 of the type more fully described in the copending application to Robert J. Ramig, Jr., Ser. No. 585,680, filed Oct. 10, 1966; now U.S. Pat. No. 3,414,206, issued Dec. 3, 1968. The tape reel 30 includes a pair of flanges 31 and 32 and a winding hub 33 mounted on the flange 31. The flange 31 has a plurality of apertures 34 formed through it and the flange 32 has a plurality of similar apertures 35 formed through it. The hub 33 has a plurality of apertures 36 formed through it and positioned in alignment with the apertures 34 in the flange 31.

The reel 30 is of the separable variety in that the flange 31 and the hub 33 can be removed from the flange 32. Normally, however, the reel 30 is retained in the condition shown in FIG. 4 by three hollow pins 37 each having an enlarged head which extend from the flange 32 through keyhole-shaped apertures 38 in the flange 32. When the reel 30 is in the conditions shown in the drawing with the heads of the pins 37 engaged with the reduced portions of the apertures 38 the separation of the flange 31 from the flange 32 is prevented. On the other hand, when the flange 31 is rotated with respect to the flange 32 from the position shown in the drawing to bring the enlarged portions of the apertures 38 into alignment with the heads of the pins 37 the flange 31 may be easily separated from the flange 32 by simply moving the flange 31 axially away from the flange 32. Undesired relative motion between the flange 31 and the flange 32 is prevented by a plurality of hollow pins 39 which extend from the flange 31 into engagement with spring loaded detents (not shown) formed in the flange 32 and positioned to engage the pins 39 whenever the reduced portions of the apertures 38 are positioned in alignment with the heads of the pins 37. Mechanism 10 shown in FIGS. 1, 2 and 3 is particularly adapted for use with the reel 30 shown in FIG. 4 because, since the tube 21 extends above the fingers 24, the reel 30 need only be placed on the tube 21 and rotated with respect to mechanism 10 until the apertures 35 of the flange 32 come into alignment with the fingers 24 whereupon the reel 30 falls into engagement with the platform 22 under the action of gravity.

Referring now to FIG. 5 a tape reel 30 of the type shown in FIG. 4 having a roll of tape T wound upon it is shown mounted on mechanism 10 of the type shown in FIG. 1. Mechanism 10 is especially adapted to receive the tape reel 30 in that the fingers 24 of turntable 20 are positioned to pass through the apertures 35 in the flange 32, the apertures 36 in the winding hub 33 and the apertures 34 in the flange 31 when the reel 30 is placed on mechanism 10. This places the fingers within the winding hub 33 and therefore within the innermost turn of the coil of tape T but without the locking portion of the reel 30. The wide portions 25 of the fingers 24 have approximately the same width as the width of the apertures 35 in the flange 32 at the point where the fingers 24 pass through the apertures 35 so that the interaction of the edges of the wide portions 25 of the fingers 24 and sides of the apertures 35 in the flange 32 prevents relative motion between the flange 32 and the turntable.

On the other hand, the narrow portions 26 of the fingers 24 do not prevent relative motion between turntable 20 and the flange 31 but rather are especially sized to permit sufficient relative motion between the flange 31 and the flange 32 to bring the enlarged portions of the apertures 38 in the flange 31 into alignment with the heads of the pins 37 extending from the flange 32. Thus, while the reel 30 is in place on the turntable 10 and while the flange 32 is prevented from moving relative to the turntable 20 the flange 31 can be moved into a position whereat it is free for axial separation from the remainder of the reel 30.

As is more fully described in the above-identified patent of Robert J. Ramig, Jr., the tape reel 30 is especially constructed to operate as a self-threading reel, that is, having means for engaging and turning the leading end of the tape as the innermost convolution of a coil being wound onto the reel without the aid of an operator. That is to say, reel 30 has a plurality of triangularly shaped projections 41 which are carried from flange 31. They are angularly spaced about hub 33 and correspond to the projections 51 of said patent. Accordingly, projections 41 are all of which is shown of means disposed within flanges 31 and 32 for applying tape in a coil with a progressively increasing diameter by engaging and turning the lead end of tape T as the innermost convolution 43 of a coil being wound on reel 30. Once the coil of said tape has been wound on the reel, (FIGS. 5 and 6), projections 41 are aptly characterized as comprising means which have engaged and turned the lead ends of tape which has been wound on said reel. Unlike other self-threading reels, however, the reel 30 operates to free the leading end of a tape from the teeth of its winding hub after a few turns of tape are wound onto the reel and to thereafter wind the tape solely by friction. Therefore, whenever the reel 30 has a coil of tape similar to the coil of tape T shown in FIG. 5 wound upon it the coil of tape T is wound about the winding hub of a reel but is not engaged with the teeth thereof.

The fact that the coil of tape T wound onto the reel 30 is not engaged with the teeth of the winding hub of the reel together with the fact that the winding hub of the reel 30 is attached to the flange 31 thereof means that if the flange 31 is moved relative to the flange 32 to bring the enlarged portions of the apertures 38 into alignment with the heads of the pins 37, the flange 32 and the winding hub 33 attached thereto can be removed from the reel 30 by simply moving the flange 32 axially along the closed end tube 21 without disturbing the coil of tape T in any manner whatsoever and thereby flange 31, hub 33 which is connected thereto, and projections 41 will become released from flange 32. When this is done the coil of tape T is left positioned about the fingers 24 of the turntable 10 with the innermost turn of the coil of tape T being spaced from the fingers 24 due to the fact that the innermost turn of the coil has a diameter at least as big as the diameter of the winding hub 33 and due to the fact that the fingers 24 were positioned within the winding drum 33 when the reel 30 was placed on mechanism 10.

Figure 6:
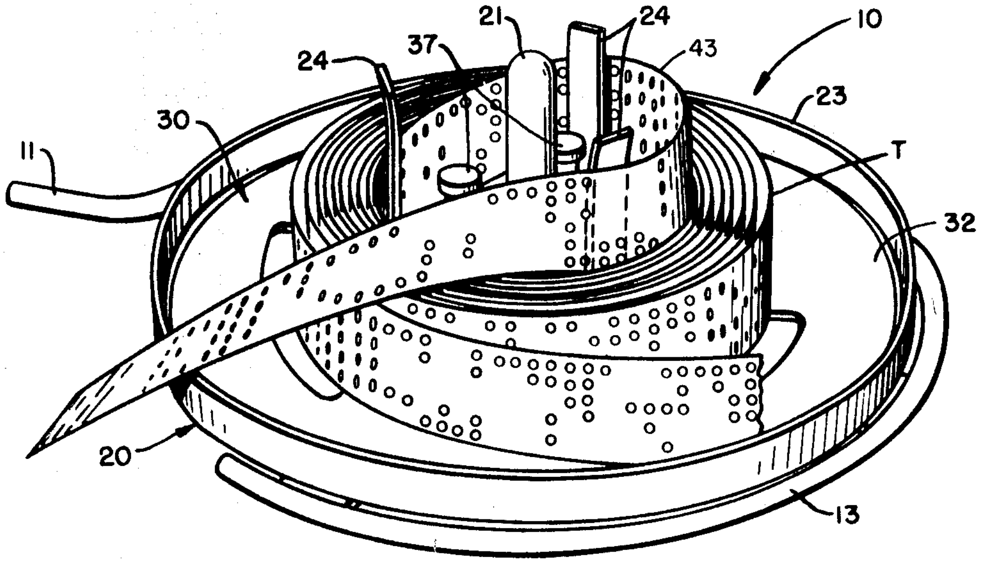
FIG. 6 is a view similar to FIG. 5 in which a portion of the tape reel has been removed.

After the flange 31 and the winding hub 33 are removed from the reel 30 the innermost turn of the coil of tape T on the reel 30 is moved to the position shown in FIG. 6 and is fed from that position to a tape utilization device. Tape can then be withdrawn from the inside of the coil of the tape T by simply pulling on the leading end of the tape since the rotatable mounting of turntable 20, the relative positions of the innermost turn of the coil tape T and the fingers 24 and the outturned distal ends of the fingers 24 cause mechanism 10 to operate as a center unwinding device in which the fingers 24 serving as a tape-guiding center column. Thus, the construction shown in the drawings results in a center unwinding mechanism in which the tape to be unwound is loaded into the mechanism in its reel thereby eliminating any danger of the tape becoming uncoiled and tangled during the loading process.

Although only one embodiment of the invention is shown in the drawings and described in the foregoing specification it will be understood that the invention is not limited to the specific embodiment shown but is capable of modification, rearrangement and substitution of parts and elements without departing from the spirit of the invention.

We claim:

1. A center unwinding mechanism including:

a pivotally supported turntable having a center column extending from it;

a tape reel having a pair of flanges, a winding hub and first means disposed within the flanges for engaging and turning the lead end of a tape as the innermost convolution of a coil to be unwound from said reel;

means for receiving the reel on the turntable with the column extending through the hub, and means for releasing one flange, the hub and said first means from the other flange with the coil on the turntable.

2. The center unwinding mechanism according to claim 1 wherein the column is comprised of a plurality of fingers extending cantilever from the turntable and forming a ring.

3. The center unwinding mechanism according to claim 1 wherein the releasing means includes a connection between the two flanges that is released upon relative movement between the flanges and means for preventing relative movement between the turntable and one of the flanges and for permitting relative movement between the turntable and the other of the flanges.

4. A tape unwinding mechanism of the type including a frame, a turntable supported on the frame for rotation about an axis and a center tape-guiding column extending along the axis, wherein the improvement comprises:

means for positioning a tape reel of the type having a pair of flanges and tape in a coil wound with a progressively increasing diameter from its center between the flanges on the turntable with the column extending through the coil and with one of the flanges in engagement with the turntable, and means for releasing the other of the flanges from the reel when the reel is on the turntable.

5. The mechanism according to claim 4 wherein the reel includes a winding hub attached to the other flange, wherein the positioning means positions the column within the hub and wherein the releasing means releases the hub along with the other flange.

6. The mechanism according to claim 4 wherein the reel includes means for securing the flanges to each other and means for releasing the flanges from each other upon a predetermined relative movement between the flanges and wherein the releasing means includes means for permitting the predetermined relative movement between the flanges while preventing relative movement between one of the flanges and the turntable.

7. A center unwinding mechanism including in combination:

a tape reel including a pair of flanges, a winding hub mounted on one of the flanges and means positioned within the hub for releaseably securing the flanges to each other, and a pivotally supported turntable including a centrally disposed axile portion, and a plurality of fingers extending from the turntable concentrically with said axile portion and disposed between the hub and the securing means when the reel is placed on the turntable.

8. The mechanism according to claim 7 wherein the flanges have apertures formed in them, wherein the fingers pass through the apertures and wherein the width of the fingers adjacent the turntable is substantially equal to the width of the apertures at the point the fingers pass through them.

9. The mechanism according to claim 8 wherein the fingers each taper from a point adjacent the turntable to their distal end and wherein the securing means releases the flanges from each other upon relative rotation between the flanges thereby permitting the removal of one flange from the reel while the reel is on the turntable.